V. A. FYNN.
METHOD OF OPERATING ALTERNATING CURRENT MOTORS.
APPLICATION FILED MAR. 29, 1912.

1,122,490.

Patented Dec. 29, 1914.

WITNESSES:
Chas. A. Becker.
G. M. Shorr.

INVENTOR:
V. A. Fynn,
BY
E. E. Huffman
ATTORNEY

UNITED STATES PATENT OFFICE.

VALÈRE ALFRED FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

METHOD OF OPERATING ALTERNATING-CURRENT MOTORS.

1,122,490.  Specification of Letters Patent.  Patented Dec. 29, 1914.

Application filed March 29, 1912. Serial No. 687,210.

*To all whom it may concern:*

Be it known that I, VALÈRE ALFRED FYNN, a subject of the King of England, residing at the Buckingham Hotel, St. Louis, Missouri, United States of America, have invented a certain new and useful Method of Operating Alternating-Current Motors, of which the following is such a full, clear, and exact description as will enable any one skilled in the art to which it appertains to make and use the same, reference being had to the accompanying drawings, forming part of this specification.

My invention relates to alternate-current motors and is particularly applicable to single-phase motors used for the operation of elevators and the like.

One object of my invention is to enable a single-phase motor to start with a moderate torque, but to so control the speed torque curve of the machine that the torque will never fall materially below the full load torque until a nearly synchronous speed is reached.

Another object is to achieve the results set forth without increasing the flux densities of the motor above the normal, without ever interrupting the primary circuit of the motor, and, preferably, also without interrupting its secondary circuit.

Figure 1:
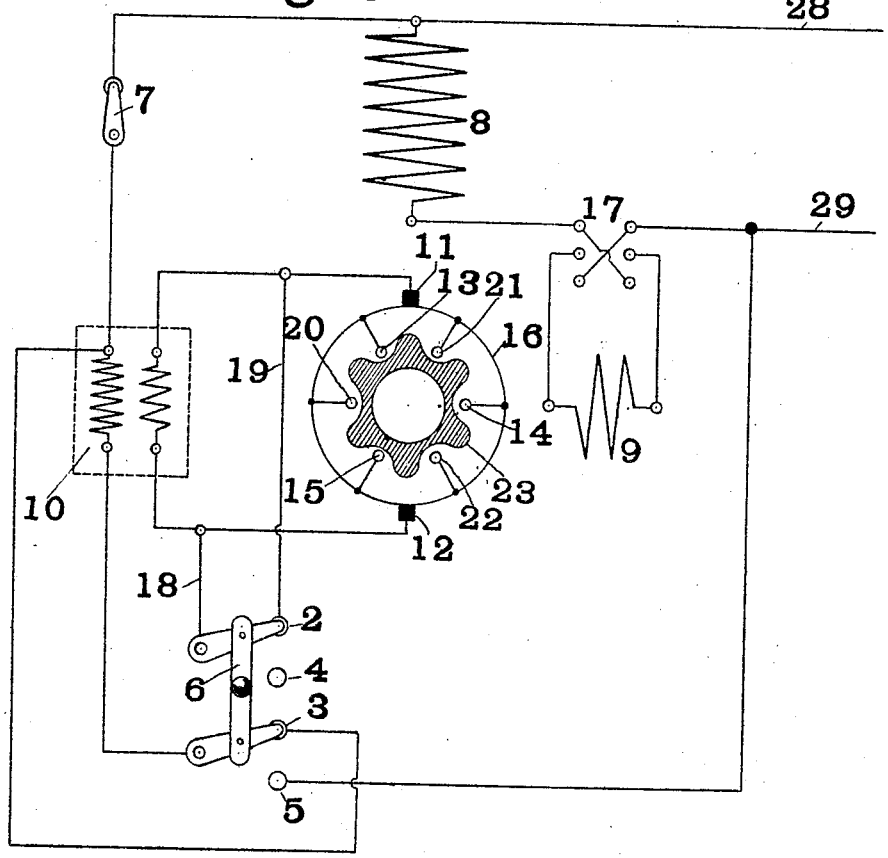
Figure 2:
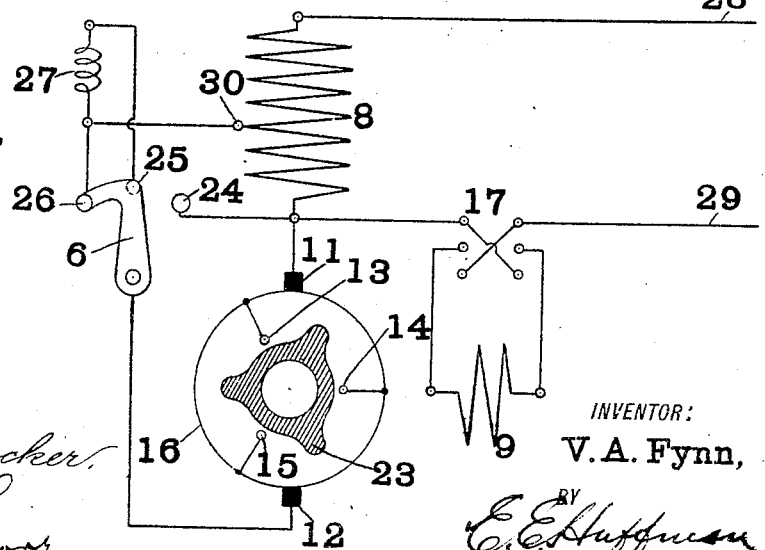

In the accompanying drawings, Figure 1 illustrates one embodiment of my invention as applied to a 2-pole single phase series induction motor and Fig. 2 shows a modification.

Referring to Fig. 1, 8 represents the main inducing winding of the motor and 9 the stator field winding. The two windings are connected in series and across the mains 28, 29, a reversing switch 17 being interposed between them for the purpose of reversing the direction of the current through the field winding 9 thus reversing the direction of rotation of the machine. The rotor is provided with a commuted winding 16 closed by way of the brushes 11, 12 along an axis practically coinciding with that of the main inducing winding 8. A number of points 13, 14, 15, 20, 21, 22 of said commuted winding are also adapted to be short-circuited by means of the conducting body 23. The brushes 11, 12 resting on the commuted winding, or on a commutator connected thereto, are connected to the secondary of a transformer 10 and also to the two-way switch 6 by means of the leads 18 and 19. The primary of the transformer 10 is connected to the line 28 by means of the switch 7, and is adapted to be connected to the line 29 by means of one of the blades of the two-way switch 6. In one position of the two-way switch 6, one of its blades short-circuits the secondary of the transformer 10 and the commuted winding 16 along the axis of 8; the other blade of this two-way switch short-circuits the primary of the transformer 10. In the other position of this two-way switch, connection between the leads 18 and 19 is interrupted, the short-circuit around the primary winding of the transformer 10 is also interrupted, and said primary is connected to the lead 29 at the point 5.

The mode of operation of this improved motor is as follows: The two-way switch 6 being placed in the position shown in Fig. 1, switch 7 is closed and switch 17 is thrown in the one or the other direction, according to the direction in which the motor is desired to run. At starting the short-circuiting device 23 is out of contact with the points 13, 14, 15, 20, 21, 22 of the commuted winding 16, and the machine starts by virtue of the interaction between the flux produced by the stator winding 9 and the currents induced in the rotor winding 16 by the stator winding 8. These currents close by way of the brushes 11, 12, partly by way of the secondary of the transformer 10, and partly by way of the leads 18, 19 and one blade of the two-way switch 6. The total number of turns in the stator windings 8 and 9 are preferably so chosen as to give as low flux densities at full load as are compatible with the required overload capacity of the motor. Under these conditions, the torque exerted by the motor in the starting connection shown in Fig. 1 will be generally nearly two times the full load torque and will, therefore, be amply sufficient to quietly start the cage of an elevator. As the speed of the motor increases, the available torque will decrease and will finally reach a value slightly exceeding the full load value at a speed greatly below the synchronous speed. This value is generally reached at six-tenths of the full load speed. When the torque has decreased to this extent, I throw the two-way switch 6 from points 2 and 3 to points 4 and 5. It will be noted that in so doing neither the primary nor the secondary circuits of the motor are interrupted even for an instant. It is further seen that when switch 6 stands on points 4 and 5 that an E. M. F. derived from the transformer 10, the primary of which is now connected across the mains, is injected into the rotor circuit comprising the brushes 11, 12. I so select the direction and phase of this E. M. F. that it will assist the E. M. F. induced in the rotor circuit by the main inducing winding 8. The rotor current will thereby be increased, resulting in an increased motor torque. It is, I find, a simple matter to so select the magnitude of this auxiliary E. M. F. that the torque produced in the motor with the help of said E. M. F. equals or slightly exceeds the full load torque at the time when the rotor has reached a nearly synchronous speed. When a speed sufficiently close to the synchronous has been reached, I short-circuit the points 13, 14, 15, 20, 21, 22 of the rotor winding 16, and either open the switch 7 or move the two-way switch 6 back to the points 2, 3.

The arrangement shown in Fig. 2 differs from that illustrated in Fig. 1 in that the auxiliary E. M. F. used for the purpose of increasing the torque of the motor, after the rotor has reached approximately one half of its synchronous speed, is not derived from a transformer 10 disposed outside the motor, but is taken from the stator, in this case from the main inducing winding 8. The switch 6 is so arranged that it can, when desired, simultaneously bridge two of the contacts 24, 25 or 25, 26 with which it coöperates. At starting, switch 6 is so placed as to cover contact 24 only and the motor is started in the one or the other direction by suitably throwing the reversing switch 17. After the motor has reached a speed equal to about one half of its synchronous speed, the switch 6 is moved so as to bridge contacts 24 and 25, thus still maintaining the short-circuit between the brushes 11, 12 and simultaneously closing that part of the winding 8 which is located between the points 24 and 30 over a resistance or inductance 27. The switch 6 is, however, not left in this position, but is quickly moved to the left, thus closing the rotor winding 16 over the resistance 27 and part of the main stator winding 8. This again is only an intermediate position of the lever 6, which should be moved as quickly as possible into the position shown in Fig. 2, in which the resistance 27 is short-circuited and the full voltage appearing between the points 24 and 30 of the main inducing winding 8 is impressed on the commuted winding 16. The resistance 27, together with the contact 25 are merely introduced so as to avoid a direct short-circuit between the points 24 and 30 of the main inducing winding 8. These points can, if necessary, be directly short-circuited, but it is preferred to connect them by way of the resistance or inductance 27. After the motor has reached a speed sufficiently close to the synchronous, the conducting body 23 is caused to short-circuit the points 13, 14, 15 of the commuted winding 16, and the switch 6 is brought back to that position in which it is in contact with point 24 only.

If the motor is reversed by reversing the current through the auxiliary stator winding 9, then the direction of the auxiliary E. M. F. injected into the rotor circuit during the latter part of its period of acceleration must remain the same regardless of the direction of rotation of the motor. If the motor is reversed by reversing the current through the main inducing winding 8 instead of the field winding 9, then this auxiliary E. M. F. should also be reversed. For this reason, it is generally preferred to reverse the field winding 9, as shown in the figures.

I have found that the magnitude of the auxiliary E. M. F. usually necessary in order to sufficiently raise the torque of the motor during the latter part of its period of acceleration is so small that the switch 6 need not necessarily be thrown back to its starting position after a plurality of points of the rotor winding have been short-circuited by means of the conducting body 23, but may, if desired, be left in that position in which the auxiliary E. M. F. is impressed on the brushes 11, 12. This will only result in a decrease in the efficiency of the motor. Since it simplifies the switching operations, this expedient may sometimes be a desirable one.

The invention has been described as applied to a motor, the inducing winding of which is stationary while the induced member is adapted to revolve, but it will be understood that the functions of stator and rotor can be readily interchanged causing the inducing member to revolve while keeping the induced member stationary without in the least departing from the spirit of this invention.

Having fully described my invention, what I claim as new and desire to secure by Letters Patent of the United States is:

1. The method of operating an alternating current motor which consists in supplying alternating current to the stator, establishing a circuit through the rotor winding along an axis angularly displaced from the axis of the resultant stator magnetization, increasing the total E. M. F. in the rotor circuit when the rotor has reached a fraction of its synchronous speed, and short-circuiting the rotor winding at a plurality of points when approximately synchronous speed has been attained.

2. The method of operating an alternating current motor which consists in supplying alternating current to the stator, establishing a circuit through the rotor winding along an axis angularly displaced from the axis of the resultant stator magnetization, introducing an auxiliary E. M. F. into the rotor circuit when the rotor has reached a fraction of its synchronous speed, and short-circuiting the rotor winding at a plurality of points when approximately synchronous speed has been attained.

3. The method of operating a single phase commutator motor which consists in supplying single phase current to the stator, closing the commuted winding by way of brushes along an axis displaced from the axis of the resultant stator magnetization to start the motor, introducing an auxiliary E. M. F. into the brush circuit when the motor has attained a fraction of its synchronous speed, and finally short-circuiting the commuted winding along a plurality of axes.

4. The method of operating a single phase commutator motor which consists in supplying single phase current to the stator, closing the commuted winding by way of brushes along an axis displaced from the axis of the resultant stator magnetization to start the motor, introducing an auxiliary E. M. F. into the brush circuit when the motor has attained a fraction of its synchronous speed, said E. M. F. being introduced without interrupting said circuit, and finally short-circuiting the commuted winding along a plurality of axes.

5. The method of operating a single phase commutator motor which consists in supplying single phase current to the stator, closing the commuted winding by way of brushes along an axis displaced from the axis of the resultant stator magnetization to start the motor, conductively introducing an auxiliary E. M. F. into the brush circuit when the motor has attained a fraction of its synchronous speed, short-circuiting the commuted winding along a plurality of axes when approximately synchronous speed has been reached, and finally withdrawing the auxiliary E. M. F. from the brush circuit.

6. The method of operating a single phase commutator motor which consists in supplying single phase current to the stator, closing the commuted winding by way of brushes along an axis displaced from the axis of the resultant stator magnetization to start the motor, conductively introducing an auxiliary E. M. F. into the brush circuit when the motor has attained a fraction of its synchronous speed, said E. M. F. being introduced without interrupting the circuit, short-circuiting the commuted winding along a plurality of axes when approximately synchronous speed has been reached, and finally withdrawing the auxiliary E. M. F. from the brush circuit.

7. The method of operating a single phase commutator motor which consists in supplying single phase current to the stator, closing the commuted winding by way of brushes along an axis displaced from the axis of the resultant stator magnetization to start the motor, introducing an auxiliary E. M. F. into the brush circuit when the motor has attained approximately one half of its synchronous speed, and finally short-circuiting the commuted winding along a plurality of axes when approximately synchronous speed has been reached.

8. The method of operating a single phase commutator motor which consists in supplying single phase current to the stator, closing the commuted winding by way of brushes along an axis displaced from the axis of the resultant stator magnetization to start the motor, introducing an auxiliary E. M. F. approximately in phase with the line E. M. F. into the brush circuit when the motor has attained a fraction of its synchronous speed, and finally short-circuiting the commuted winding along a plurality of axes.

9. The method of operating a single phase commutator motor which consists in supplying single phase current to the stator, closing the commuted winding by way of brushes along an axis displaced from the axis of the resultant stator magnetization to start the motor, introducing an auxiliary E. M. F. approximately in phase with the line E. M. F. into the brush circuit when the motor has attained a fraction of its synchronous speed, said E. M. F. being introduced without interrupting said circuit, and finally short-circuiting the commuted winding along a plurality of axes.

10. The method of operating a single phase commutator motor which consists in supplying single phase current to the stator, closing the commuted winding by way of brushes along an axis displaced from the axis of the resultant stator magnetization to start the motor, introducing an auxiliary E. M. F. derived from a stator winding into the brush circuit when the motor has attained a fraction of its synchronous speed, and finally short-circuiting the commuted winding along a plurality of axes.

11. The method of operating a single phase commutator motor, which consists in supplying single phase current to the stator, closing the commuted winding by way of brushes along an axis displaced from the axis of the resultant stator magnetization to start the motor, conductively introducing into the brush circuit an auxiliary E. M. F.

derived from a stator winding in the axis of said brushes when the motor has attained a fraction of its synchronous speed, and short-circuiting the commuted winding along a plurality of axes when approximately synchronous speed has been reached.

12. The method of operating an alternating current motor in which the rotor is closed by way of brushes along an axis displaced from the axis of the resultant stator magnetization at starting, which consists in increasing the total E. M. F. in the brush circuit when the motor has attained approximately one half of its synchronous speed, and finally short-circuiting the commuted winding along a plurality of axes.

In testimony whereof, I have hereunto set my hand and affixed my seal.

VALÈRE ALFRED FYNN. [L. S.]

Witnesses:
W. A. ALEXANDER,
G. M. SHORE.